2,979,376

PRODUCTION OF RAYON

Marion R. Lytton, West Chester, Pa., assignor to American Viscose Corporation, Philadelphia, Pa., a corporation of Delaware No Drawing. Filed June 29, 1955, Ser. No. 518,990

5 Claims. (Cl. 18—54)

This invention relates to the production of shaped bodies of regenerated cellulose from viscose and more particularly to filaments and fibers of regenerated cellulose from viscose.

In the conventional methods of producing shaped bodies of regenerated cellulose from viscose, a suitable cellulosic material such as purified cotton linters, wood pulp, mixtures thereof, and the like is first converted to an alkaline cellulose by treatment with a caustic soda solution and after shredding the treated cellulose material, it is allowed to age. The aged alkali cellulose is then converted to a xanthate by treatment with carbon disulfide. The cellulose xanthate is subsequently dissolved in a caustic soda solution in an amount calculated to provide a viscose of the desired cellulose and alkali content. After filtration, the viscose solution is allowed to ripen and is subsequently extruded through a shaped orifice into a suitable coagulating and regenerating bath.

In the production of shaped bodies such as filaments, the viscose solution is extruded through a spinneret into a coagulating and regenerating bath consisting of an aqueous acid solution containing zinc sulfate. The filament may subsequently be passed through a hot aqueous bath where it is stretched to improve its properties such as tensile strength. The filament may then be passed through a dilute aqueous solution of sulfuric acid and sodium sulfate to complete the regeneration of the cellulose, in case it is not completely regenerated upon leaving the stretching stage. The filament is subsequently subjected to washing, purification, bleaching, possibly other treating operations and drying, being collected either before or after these treatments.

In my copending application, Serial No. 518,987, filed June 29, 1955, now Patent No. 2,841,462, granted July 1, 1958, there is disclosed the use of alkylene oxide adducts of p,p'-diphenol in viscose for improving the properties and characteristics of shaped bodies of regenerated cellulose. The principal distinguishing characteristics of such products as filaments formed by the use of these modifying agents compared to products formed by conventional methods are that the filaments have a smooth, non-crenulated surface and consist entirely of skin. Although these improved characteristics are obtained in filaments when spun at high speeds (for example, 45 meters per minute), there is a loss in the tenacity or tensile strength as compared to conventional filaments.

It has now been discovered that the presence of small amounts of alkali-soluble alkylene oxide adducts of p,p'-isopropylidenediphenol in viscose results in the production of shaped bodies of regenerated cellulose such as filaments, films, sheets, and the like having an improved tenacity or tensile strength.

This invention contemplates the use of such compounds as are more technically classed as polyoxyalkylene glycol ethers of p,p'-isopropylidenediphenol such as, for example, the ethers of ethylene and propylene glycols and p,p'-isopropylidenediphenol. It is obvious that for all practical purposes considering cost, ease of preparation, commercial availability and solubility in water and alkali solutions such as a 6% caustic solution, the polyoxyethylene glycol ethers or ethylene oxide adducts of p,p'-isopropylidenediphenol are preferred. Accordingly, the invention will be illustrated specifically by reference to the polyoxyethylene glycol ethers.

The polyoxyethylene content of the adducts or ethers may vary from about 2 to 50 and more ethylene oxide units per molecule of p,p'-isopropylidenediphenol, the preferred ethers containing from about 6 to about 30 ethylene oxide units per molecule. The ether may be conveniently added to the viscose in the form of a solution in alkali or in water.

The amount of the ether or adduct which is incorporated in the viscose must be at least about 0.25% by weight of the cellulose, preferably, the amount used is from about 0.5% to 2%. Lesser amounts do not result in the production of products of improved tenacity. Amounts greater than about 4% or 5% are not necessary and do not improve proportionately to the increase in tensile strength. The ether or adduct may be added at any desired stage in the production of the viscose, preferably being added after the cellulose xanthate has been dissolved in the caustic solution.

The viscose may contain from about 4% to about 10% cellulose, the particular source of the cellulose being selected for the ultimate use of the regenerated cellulose product. The caustic soda content may be from about 4% to about 8% and the carbon disulfide content may be from about 30% to about 50% based upon the weight of the cellulose. The modified viscose, that is, a viscose containing the small amount of the ether or adduct, may have a salt test above about 7 and preferably above about 9 at the time of spinning or extrusion.

Any desired spinning bath may be used, preferably, however, the spinning bath is a low acid-high zinc spinning bath. The bath should contain from about 10% to about 25% sodium sulfate and from about 3% to about 15% zinc sulfate, preferably from 15% to 22% sodium sulfate and from 4% to 9% zinc sulfate. Other metal sulfates such as iron, manganese, nickel and the like may be present and may replace some of the zinc sulfate. The temperature of the spinning bath may vary from about 25° C. to about 80° C., preferably between about 45° C. to about 70° C. As is well known in the conventional practice in the art, certain of the physical properties such as tensile strength vary directly with the temperature of the spinning bath. Thus, in the production of filaments for tire cord purposes in accordance with the method of this invention, the spinning bath is preferably maintained at a temperature between about 55° C. and 65° C. so as to obtain the desired high tensile strength.

The lower limit of the acid concentration of the spinning bath, as is well known in the art, is just above the slubbing point, that is, the concentration at which small slubs of uncoagulated viscose appear in the strand as it leaves the spinning bath. For commercial operations, the acid concentration is generally maintained about 0.4% to 0.5% above the slubbing point. For any specific viscose composition, the acid concentration of the spinning bath must be maintained above the slubbing point. In general, the spinning bath preferably contains between about 6% and 9% sulfuric acid, however, greater amounts may be used.

The presence of the adducts or ethers in the viscose retards the coagulation and, therefore, the amount of ether employed is preferably reduced at high spinning speeds. Thus, for optimum improvement of a filament or yarn formed from a viscose as above and at higher spinning speeds such as about 50 meters per minute, the adduct is employed in amounts within the lower portion of the range, for example, in the neighborhood of about 1%. The determination of the optimum concentration of acid for any specific viscose, spinning bath and spinning speed is a matter of simple experimentation for those skilled in the art. The extruded viscose must, of course, be immersed or maintained in the spinning bath for a period sufficient to effect relatively complete coagulation of the viscose, that is, the coagulation must be sufficient so that the filaments will not adhere to each other as they are brought together and withdrawn from the bath.

In the production of filaments for such purposes as the fabrication of tire cord, the filaments are preferably stretched after removal from the initial coagulating and regenerating bath. From the initial spinning bath, the filaments may be passed through a hot aqueous bath which may consist of hot water or a dilute acid solution and may be stretched from about 70% to about 110%, preferably between 80% and 100%. Yarns for other textile purposes may be stretched as low as 20%. The precise amount of stretching will be dependent upon the desired tenacity and other properties and the specific type of product being produced. It is to be understood that the invention is not restricted to the production of filaments and yarns but it is also applicable to other shaped bodies such as sheets, films, tubes and the like. The filaments may then be passed through a final regenerating bath which may contain from about 1% to about 5% sulfuric acid and from about 1% to about 5% sodium sulfate with or without small amounts of zinc sulfate if regeneration has not previously been completed.

The treatment following the final regenerating bath, or the stretching operation where regeneration has been completed, may consist of a washing step, a desulfurizing step, the application of a finishing or plasticizing material and drying before or after collecting, or may include other desired and conventional steps such as bleaching and the like. The treatment after regeneration will be dictated by the specific type of shaped body and the proposed use thereof.

The invention may be illustrated by reference to the preparation of regenerated cellulose filaments from a viscose containing about 7.4% cellulose, about 6.6% caustic soda, and having a total carbon disulfide content of about 36% based on the weight of the cellulose. The viscose solutions were prepared by xanthating akali cellulose by the introduction of 36% carbon disulfide, based on the weight of the cellulose, and churning for about 2½ hours. The cellulose xanthate was then dissolved in caustic soda solution. The polyoxyethylene glycol ether of p,p'-isopropylidenediphenol was added to the caustic soda solution and mixed for about ½ hour. In the examples which follow, the amount of added ether is based upon the weight of cellulose in the viscose. The viscose was then allowed to ripen for about 30 hours at 18° C.

*Example 1*

Approximateley 0.5% of a polyoxyethylene glycol ether of p,p'-isopropylidenediphenol, containing about 20 ethylene oxide units per molecule of p,p'-isopropylidenediphenol, was added to and incorporated in viscose as described above. The viscose employed in the spinning of filaments had a salt test of 10.5. The viscose was extruded through a spinneret to form a 200 denier, 100 filament yarn at a rate of about 22 meters per minute. The coagulating and regenerating bath was maintained at a temperature of about 60° C. and contained 7.4% sulfuric acid, 5% zinc sulfate and 16% sodium sulfate. The yarn was passed over a godet from which it was conducted through a hot water bath maintained at about 95° C. During the travel through the hot water bath, the yarn was stretched approximately 82%. The yarn was then collected in a spinning box, washed free of acid and salts and dried. The physical properties are set forth in the table which follows the examples.

*Example 2*

About 1% of the same ether was added to and incorporated in viscose and the procedure of Example 1 was repeated. The conditions were identical with those of Example 1 with the exception that the viscose had a salt test of 10.7 and the spinning bath contained 7.5% sulfuric acid. The physical properties of the yarn are set forth in the table which follows the examples.

*Example 3*

Viscose prepared as described above, but without added p,p'-isopropylidenediphenol ether and having a salt test of 10.6 was spun into a yarn under the same conditions as set forth in Example 1. The physical properties of the yarn are set forth in the table which follows the examples.

*Example 4*

Approximately 0.5% of a polyoxyethylene glycol ether of p,p'-isopropylidenediphenol, containing about 20 ethylene oxide units per molecule, was added to and incorporated in viscose as described above. The viscose had a salt test of 9.3 and was spun into a 200 denier, 100 filament yarn by extrusion into a bath containing 7.8% sulfuric acid, 5% zinc sulfate and 17% sodium sulfate. The bath was maintained at a temperature of 60° C. The extrusion rate was about 22 meters per minute. The yarn was passed over a godet from which it was conducted through a hot water bath maintained at about 95° C. During the travel through the hot water bath the yarn was stretched about 82%. The yarn was then collected in a spinning box, washed free of acid and salts and dried. The physical characteristics of the yarn are set forth in the table which follows the examples.

*Example 5*

Example 4 was repeated with viscose containing about 0.75% of the polyoxyethylene glycol ether of p,p'-isopropylidenediphenol containing 20 ethylene oxide units per molecule. All other conditions were identical to those of Example 4 with the exception that the spinning bath contained 18% sodium sulfate. The physical properties of the yarn are set forth in the table which follows the examples.

*Example 6*

Viscose prepared as described above, but without added modifier and having a salt test of 9.1 was spun under the same conditions as those of Example 4. The physical properties of the yarn are set forth in the table which follows the examples.

*Example 7*

About 0.5% of the same modifier as used in the foregoing examples was added to and incorporated in the viscose. The viscose employed in the spinning of filaments had a salt test of 9.8 and was extruded through a spinneret to form a 200 denier, 100 filament yarn at a rate of about 43 meters per minute. The coagulating and regenerating bath was maintained at a temperature of about 60° C. and contained 8.3% sulfuric acid, 5% zinc sulfate and 15% sodium sulfate. The yarn was passed over a godet from which it was conducted through a hot water bath maintained at about 95° C. During the travel through the hot water bath, the yarn was stretched approximately 75%. The yarn was then collected in a spinning box, washed free of acid and salts and dried. The physical properties of the yarn are set forth in the table.

*Example 8*

Example 7 was repeated with viscose containing about 1% of the same modifier. The viscose had a salt test of 10.0 and all other conditions were identical to those of Example 7 except that the sodium sulfate content of the spinning bath was 16%. The physical properties of the yarn are set forth in the table.

Example 9

Viscose prepared as described above but without added modifier and having a salt test of 10.6 was spun into a yarn under conditions identical to those set forth in Example 7. The physical properties of the yarn are set forth in the table which follows the examples.

Example 10

About 0.5% of a polyoxyethylene glycol ether of p,p'-isopropylidenediphenol having about 20 ethylene oxide units per molecule was added to and incorporated in the viscose. The viscose had a salt test of 9.0 and was spun into a 200 denier, 100 filament yarn by extrusion into a bath containing 8.6% sulfuric acid, 5% zinc sulfate and 17% sodium sulfate. The bath was maintained at a temperature of 60° C. The extrusion rate was about 43 meters per minute. The yarn was passed over a godet from which it was conducted through a hot water bath maintained at about 95° C. During the travel through the hot water, the yarn was stretched about 75%. The yarn was then collected in a spinning box, washed free of acid and salts and dried. The physical properties of the yarn are set forth in the table.

Example 11

Example 10 was repeated with viscose containing about 0.75% of the modifier. The viscose had a salt test of 8.9 and all other conditions were identical to those of Example 10. The physical properties of the yarn are set forth in the table.

Example 12

Viscose prepared as described above but without added modifier and having a salt test of 9.1 was spun into a yarn under the same conditions as set forth in Example 10. The physical properties of the yarn are set forth in the table.

The improvements in the physical properties of viscose rayon and other shaped products obtained by the incorporation of the polyoxyethylene glycol ethers of p,p'-isopropylidenediphenol in the viscose are apparent from the table which follows, the data being also representative of the general improvements for other polyoxyalkylene glycol ethers containing different amounts of ethylene oxide:

|  | Tenacity, Grams per denier | | Elongation, Percent | |
| --- | --- | --- | --- | --- |
|  | Wet | Dry | Wet | Dry |
| Spin Speed—22 m./min. 82% Stretch | | | | |
| Example 1 | 2.5 | 3.3 | 27 | 19 |
| Example 2 | 2.4 | 3.0 | 29 | 20 |
| Example 3 | 2.1 | 2.8 | 29 | 20 |
| Example 4 | 2.7 | 3.6 | 26 | 20 |
| Example 5 | 2.7 | 3.6 | 26 | 21 |
| Example 6 | 2.2 | 2.9 | 26 | 20 |
| Spin Speed—43 m./min. 75% Stretch | | | | |
| Example 7 | 2.0 | 3.0 | 23 | 19 |
| Example 8 | 2.1 | 3.0 | 23 | 19 |
| Example 9 | 1.8 | 2.8 | 22 | 19 |
| Example 10 | 1.9 | 2.9 | 24 | 19 |
| Example 11 | 1.9 | 2.9 | 22 | 18 |
| Example 12 | 1.8 | 2.8 | 23 | 20 |

Although the tenacity and elongation are the only properties set forth, they have been chosen because of the ease and simplicity with which such properties may be determined. It will be noted that the enhancement of the tensile strength of products made in accordance with this invention is effected with substantially no affect upon the elongation properties of the filaments.

The ethers of p,p'-isopropylidenediphenol may be added to any desired viscose such as those normally used in industry, the specific viscose composition set forth above, being merely for illustrative purposes. The adducts or ethers may be added at any desired stage in the production of the viscose and may be present in the cellulosic raw material although it may be necessary to adjust the amount present to produce a viscose having the proper proportion of the additive at the time of spinning.

While preferred embodiments of the invention have been disclosed, the description is intended to be illustrative and it is to be understood that changes and variations may be made without departing from the spirit and scope of the invention as defined by the appended claims.

I claim:

1. In a method of producing shaped bodies of regenerated cellulose having enhanced tensile strength, the step which comprises extruding viscose containing from about 0.25% to about 5%, based on the weight of the cellulose in the viscose, of an alkali-soluble polyoxyalkylene glycol ether of p,p'-isopropylidiphenol into an aqueous spinning bath containing from about 10% to about 25% sodium sulfate, from about 3% to about 15% zinc sulfate and sulfuric acid, the sulfuric acid content of the spinning bath being between the slubbing point and about 9%.

2. The step in the method as defined in claim 1 wherein the polyoxyalkylene glycol ether is a polyoxyethylene glycol ether of p,p'-isopropylidenediphenol containing from about 6 to about 30 ethylene oxide units per molecule.

3. The method of producing shaped bodies of regenerated cellulose having enhanced tensile strength which comprises adding to and incorporating in viscose from about 0.25% to about 5% of an alkali-soluble polyoxyalkylene glycol ether of p,p'-isopropylidenediphenol, the amount being based upon the weight of the cellulose, and extruding the viscose into an aqueous spinning bath containing sodium sulfate, zinc sulfate and sulfuric acid, the sulfuric acid content of the spinning bath exceeding the slubbing point but not exceeding about 9%.

4. The method as defined in claim 3 wherein the polyoxyalkylene glycol ether is a polyoxyethylene glycol ether of p,p'-isopropylidenediphenol containing from about 6 to about 30 ethylene oxide units per molecule.

5. The method of producing shaped bodies of regenerated cellulose having enhanced tensile strength which comprises adding to and incorporating in a viscose from about 0.5% to about 2% of an alkali-soluble polyoxyethylene glycol ether of p,p'-isopropylidenediphenol, the amount being based upon the weight of the cellulose, the ether containing from about 6 to about 30 ethylene oxide units per molecule of p,p'-isopropylidenediphenol, ripening the viscose to a salt point of not less than 9 and extruding the viscose into an aqueous spinning bath containing from about 16% to about 20% sodium sulfate, from about 4% to about 9% zinc sulfate and sulfuric acid, the sulfuric acid content of the spinning bath being between the slubbing point and about 9%.

References Cited in the file of this patent

UNITED STATES PATENTS

| 2,312,152 | Davis | Feb. 23, 1943 |
| --- | --- | --- |
| 2,331,265 | Coleman et al. | Oct. 5, 1943 |
| 2,373,712 | Schlosser | Apr. 17, 1945 |
| 2,451,558 | Schlosser et al. | Oct. 19, 1948 |
| 2,535,044 | Cox | Dec. 26, 1950 |
| 2,593,466 | MacLaurin | Apr. 22, 1952 |
| 2,664,360 | Charles et al. | Dec. 29, 1953 |
| 2,710,861 | Charles et al. | June 14, 1955 |
| 2,732,279 | Tachikawa | Jan. 24, 1956 |
| 2,775,505 | Pedlow | Dec. 25, 1956 |
| 2,777,775 | Edwards | Jan. 15, 1957 |
| 2,841,462 | Lytton | July 1, 1958 |

FOREIGN PATENTS

| 824,949 | Germany | Dec. 17, 1951 |
| --- | --- | --- |